United States Patent
Nahari

(10) Patent No.: US 9,489,503 B2
(45) Date of Patent: Nov. 8, 2016

(54) BEHAVIORAL STOCHASTIC AUTHENTICATION (BSA)

(75) Inventor: Hadi Nahari, Mountain View, CA (US)

(73) Assignee: PAYPAL, INC., San Jose, CA (US)

(*) Notice: Subject to any disclaimer, the term of this patent is extended or adjusted under 35 U.S.C. 154(b) by 702 days.

(21) Appl. No.: 12/877,939

(22) Filed: Sep. 8, 2010

(65) Prior Publication Data

US 2012/0060214 A1    Mar. 8, 2012

(51) Int. Cl.
  G06F 7/04      (2006.01)
  G06F 21/34     (2013.01)
  H04W 12/06     (2009.01)
  G06F 21/31     (2013.01)

(52) U.S. Cl.
  CPC ............. *G06F 21/34* (2013.01); *G06F 21/316* (2013.01); *H04W 12/06* (2013.01); *G06F 21/31* (2013.01); *H04L 2463/082* (2013.01)

(58) Field of Classification Search
  CPC ...... G06F 21/31; G06F 21/32; G06F 21/316; G06F 21/34; H04L 29/06809; H04L 2463/082; H04W 12/06
  See application file for complete search history.

(56) References Cited

U.S. PATENT DOCUMENTS

| | | | |
|---|---|---|---|
| 5,229,764 A * | 7/1993 | Matchett et al. | 340/5.52 |
| 7,039,951 B1 * | 5/2006 | Chaudhari et al. | 726/7 |
| 7,206,938 B2 * | 4/2007 | Bender et al. | 713/186 |
| 7,389,917 B2 * | 6/2008 | Abraham et al. | 235/382 |
| 7,536,722 B1 | 5/2009 | Saltz et al. | |
| 8,020,005 B2 * | 9/2011 | Mani et al. | 713/182 |
| 8,370,639 B2 * | 2/2013 | Azar et al. | 713/186 |
| 2002/0143634 A1 | 10/2002 | Kumar et al. | |
| 2003/0115151 A1 | 6/2003 | Wheeler et al. | |
| 2005/0008148 A1 * | 1/2005 | Jacobson | 380/26 |
| 2006/0149635 A1 * | 7/2006 | Bhatti et al. | 705/23 |
| 2006/0165060 A1 | 7/2006 | Dua | |
| 2006/0224470 A1 | 10/2006 | Garcia Ruano et al. | |
| 2006/0280339 A1 * | 12/2006 | Cho | 382/115 |
| 2007/0061590 A1 * | 3/2007 | Boye et al. | 713/186 |
| 2007/0236330 A1 * | 10/2007 | Cho et al. | 340/5.54 |
| 2008/0141033 A1 | 6/2008 | Ginter et al. | |
| 2009/0070272 A1 | 3/2009 | Jain | |
| 2010/0115610 A1 * | 5/2010 | Tredoux et al. | 726/19 |
| 2010/0269166 A1 * | 10/2010 | Awad et al. | 726/7 |
| 2011/0247058 A1 * | 10/2011 | Kisters | 726/5 |

FOREIGN PATENT DOCUMENTS

WO    WO 2009/158420    12/2009

* cited by examiner

*Primary Examiner* — Krista Zele
*Assistant Examiner* — James Forman
(74) *Attorney, Agent, or Firm* — Haynes and Boone, LLP

(57) ABSTRACT

Methods and systems for authenticating a user and a consumer electronic device (CED) to a financial services provider (FSP) for purposes of communications initiated from the device and needing security, such as purchases and financial transactions, are provided. The FSP may compile information about a user's behavior from various sources, both public and private, including the CED. The information may be of a stochastic nature, being gathered by sampling user data and behavior at chosen times. The information may include indicators of user behavior—such as the user using the device to check various accounts and web-pages—and data from the device—such as GPS location. Based on the compiled stochastic information, and using a sliding scale, a throttling mechanism, acceptance variation, and pinging information, the FSP can compare current information from the device with what is known about the user and the device to provide a more accurate and reliable authentication process.

20 Claims, 3 Drawing Sheets

BEHAVIORAL STOCHASTIC AUTHENTICATION (BSA)

CROSS REFERENCE TO RELATED APPLICATIONS

The present application is related to U.S. patent application Ser. No. 12/643,972, filed Dec. 21, 2009, entitled "Trusted Integrity Manager (TIM)", which is incorporated by reference. The present application is also related to U.S. patent application Ser. No. 12/751,733, filed Mar. 31, 2010, entitled "Trusted Remote Attestation Agent (TRAA)", which is incorporated by reference; U.S. patent application Ser. No. 12/752,988, filed Apr. 1, 2010, entitled "Interactive Phishing Detection (IPD)", which is incorporated by reference; U.S. patent application Ser. No. 12/732,168, filed Mar. 25, 2010, entitled "Hardware Zero-Knowledge Strong Authentication (HOKSA)", which is incorporated by reference; and U.S. patent application Ser. No. 12/718,912, filed Mar. 5, 2010, entitled "Secure Identity Binding (SIB)", which is incorporated by reference; all of which are continuations in part of application Ser. No. 12/643,972, referenced above.

BACKGROUND

1. Technical Field

Embodiments of the present invention generally relate to secure communications initiated from a consumer electronic device and, more particularly, to authenticating a user and the device for purposes of communications initiated from the device and needing security, such as purchases and financial transactions.

2. Related Art

In direct (face-to-face) or online financial transactions customers may search for and purchase products and/or services from a merchant. In the case of online shopping, transactions are conducted through electronic communications with online merchants over electronic networks. A variety of electronic devices and various electronic techniques may be used to conduct such electronic transactions. Methods of initiating or making financial transactions from an electronic device include, for example, SMS (Short Message Service), radio frequency identification (RFID) or near field communication (NFC) at a point-of-sale (POS), and mobile Internet-based payments, by which customers search for and purchase products and services through electronic communications with online merchants over electronic networks such as the Internet. Such electronic transactions may be conducted via wireless communication, also referred to as "over-the-air" (OTA) communication—which may include ordinary (e.g., longer distance) radio frequency (RF) communication; mid-range communication such as Wi-Fi or Bluetooth; or short-range RFID or NFC, for communication over a distance that is typically less than about 4 inches). Such transactions may be conducted, for example, with a cell phone using the cell phone's normal RF communication or using NFC if the cell phone is NFC-enabled. Other mobile devices, in addition to cell phones, that may provide OTA communication for facilitating such transactions may include, for example, radio frequency-enabled credit and debit cards, key fobs, mobile Internet devices, consumer electronics (not limited to, but as an example, a contactless and proximity enabled personal computer (PC) or laptop) and contactless and proximity enabled personal digital assistants (PDA).

When conducting secure communications, such as financial transactions, via any kind of consumer electronic device (CED), security is generally an issue in that the data transferred may typically include credit card and financial instrument information such as a user name, account number, a PIN, or a password, for example, that are susceptible to abuse such as theft or malicious attack. Thus, a central issue with consumer electronic devices—such as a personal computer (PC), a laptop, mobile phone, NFC enabled mobile device, for example, or other CEDs—is the need for authentication of the device and its user for secure communications.

Authentication is a fundamentally difficult and important problem to solve. Authentication is based, first, on identification. Identification may be based on the identifying materials that an entity presents to establish who an entity is, for example, an identification (ID) card with a picture or image of the entity. Such presenting of identifying materials to establish identity is usually called an "identity claim." Subsequent to identification is authentication. Authentication usually includes a process of proving whether the identity claim asserted by the identified entity is true or not. For comparison, identification may include the "presentation" of identification material, whereas authentication is the assertion—the act that happens—usually in the form of verification. For the ID card image example, the authenticator may compare the ID card image to the actual appearance of the person, and if the actual appearance matches the image to within a degree of certainty, then the authenticator may make a decision—e.g., "yes, the person is who she claims she is"—or if the appearance does not match to within the required degree of certainty, then the authenticator may make a different decision—e.g., "no, permission is not granted or alternative authentication is required."

SUMMARY

According to one or more embodiments of the present invention, a financial services provider (FSP) compiles information about a user's behavior from cookies and other sources from a user's consumer electronic device (CED), which may include, for example, a mobile phone, a personal computer (PC), a laptop computer, a personal digital assistant (PDA), an NFC-enabled mobile device, a NetTop device or NetTV. The information may be of a stochastic nature and may include instances of user behavior indicated by use of the CED and by sensors included in the CED such as an accelerometer (providing, e.g., pedometer data) or global positioning system (GPS) (providing, e.g., location data). The FSP may take discrete samples daily or at some other time interval. Based on the compiled stochastic information, the FSP may form a behavioral history of the user through the user's device. Then, when attempting to authenticate the user or the device to the FSP, the FSP can compare current information from the device with what is known about the user and the device to provide a more accurate and reliable authentication process.

In one or more embodiments, a system is provided for use with a service provider and a consumer electronic device. The system includes a database for collecting and accessing stochastic behavioral information associated with a user and a processor configured to: access the database for authenticating the user; communicate with the consumer electronic device for providing communication between the user and the processor; and authenticate the user according to stochastic information accessed from the database about the user.

In another embodiment, a method is provided for use with a service provider and a consumer electronic device. The method includes: authenticating the consumer electronic device with the service provider via a deterministic method; and, conditional upon authenticating the consumer electronic device via the deterministic method, authenticating the consumer electronic device based on stochastic material associated with a user of the consumer electronic device. Furthermore, the data that is collected from the consumer electronic device by the service provider may be associated with the user of the consumer electronic device, and therefore may be used to authenticate the user of the consumer electronic device.

In a further embodiment, a computer program product comprises a computer readable medium having computer readable and executable code for instructing a processor to perform a method that includes: authenticating the consumer electronic device with the service provider via a deterministic method that includes authenticating a user credential; and, conditional upon authenticating the consumer electronic device via the deterministic method, authenticating the consumer electronic device based on stochastic material associated with a user of the consumer electronic device. The stochastic authenticating process includes comparing current information from the device regarding use of the user credential to the stochastic material associated with the user, for which: the current information regarding use of the user credential comprises a specific instance of the stochastic material; the stochastic material associated with the user portrays a pattern of variation; the specific instance of stochastic material is judged to fit a portrait based on the pattern of variation using a sliding scale; a value of the sliding scale is assigned to the authenticating of the consumer electronic device; the stochastic material associated with the user is used to form an acceptance variation; the specific instance of stochastic material is judged to either fit or not fit within the acceptance variation; and a level of authentication is provided based on the sliding scale value and the fit of the acceptance variation.

DETAILED DESCRIPTION

Figure 1:
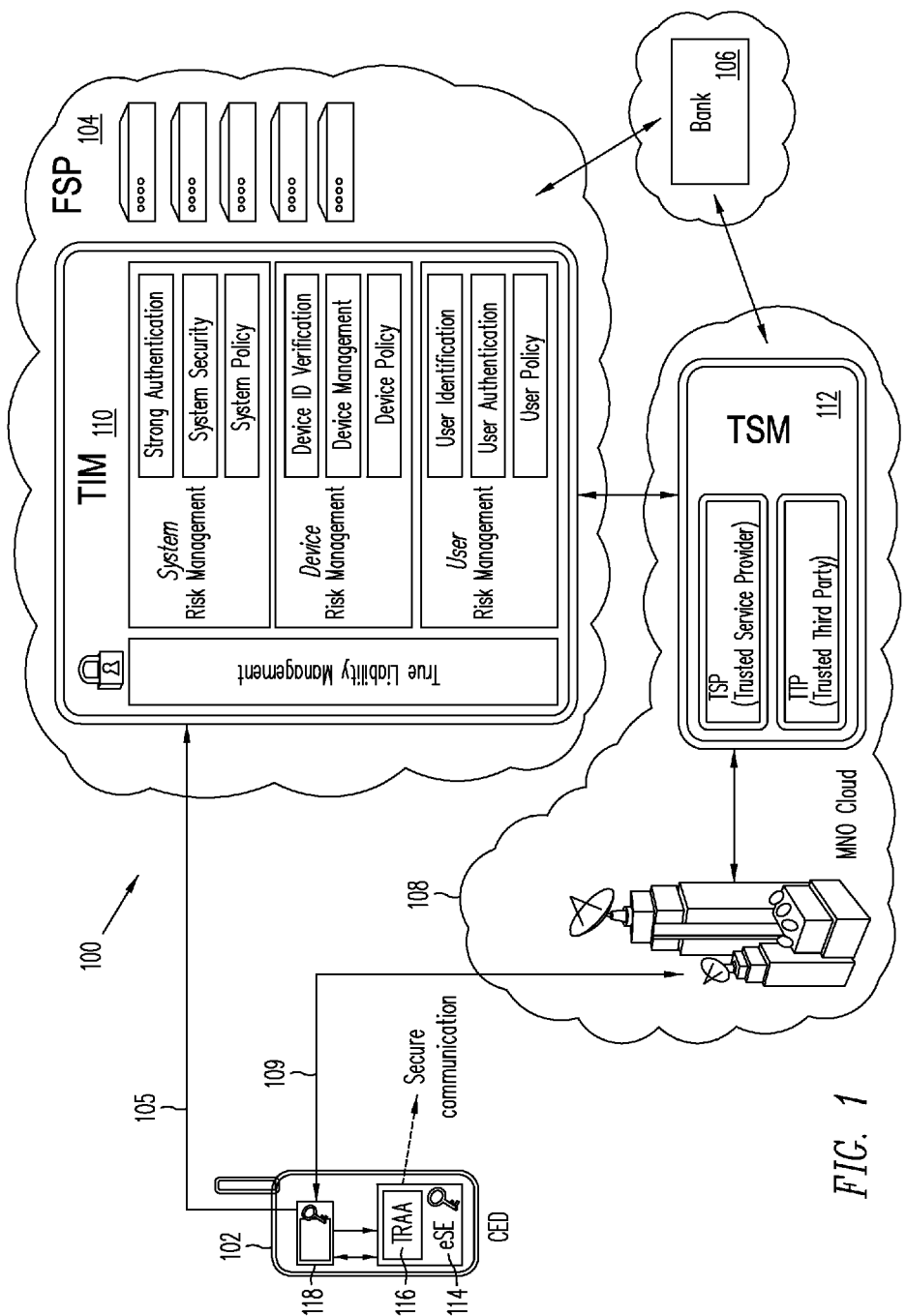
FIG. 1 is a system diagram illustrating entities and operational relationships of a system employing behavioral stochastic authentication in accordance with an embodiment of the present invention.

Embodiments of the present invention relate to providing authentication of a consumer electronic device (CED) and its user for secure communications initiated from the device, for example, with a financial services provider or a merchant. According to one or more embodiments of the present invention, a financial services provider (FSP) may compile information about a user's behavior from various sources, both public and private, such as public databases, social networking sites, web browser cookies, and a consumer electronic device (CED) used by or belonging to the user. The term CED may include reference, for example, to a mobile phone, a personal computer (PC), a laptop computer, a personal digital assistant (PDA), an NFC-enabled mobile device, a NetTop device or a NetTV. The information, gathered by sampling user data and behavior at various non-specific times, thus may be of a stochastic nature and may include indicators of user behavior such as the user checking a specific bank account each weekday at a regular time, checking Facebook every 15 minutes, or using g-mail, to provide just a few examples. Also, for example, the stochastic information may include accelerometer data from the CED (for example, the user may take a mobile phone on a run each morning). As a further example, the CED may include a GPS system that can be used to indicate the user's location at various sample times. The FSP may take discrete samples of the various types of data daily or at some other chosen time interval. Based on the compiled stochastic information, the FSP may form a behavioral history of the user via the user's device. Then, when the user is requesting to authenticate to the FSP—such as for initiating a financial transaction via a mobile phone—the FSP can compare current information from the device being used—a mobile phone in this example—to make the request with what is known about the user and the device to provide a more accurate and reliable authentication process.

In one or more embodiments, the stochastic behavioral information compiled by the FSP may be publicly available. Results of the FSP compiling stochastic material associated with a user do not need to become publicly available for embodiments to function. In contrast to other types of uses for such data, e.g., marketing and behavioral targeting, the behavior of the user is not something that is either the intention or a side effect of authentication to make available to other entities, e.g., marketing entities, either for profit or other purposes. Stochastic behavioral authentication according to one or more embodiments may rely on information that is already publicly available, and private information does not need to become publicly available for those embodiments to function.

One challenge for providers of secure communication systems is that attackers, e.g., persons who try to gain access to information that is not intended to be revealed to them, is the difficulty of repairing a "broken" security system. In effect, an attacker need only find a single flaw in a security system despite system designers' best efforts to eliminate all weaknesses. From a system designer's point of view, an attacker need only be "right" once, whereas it is incumbent on the system designer to be "right" all the time. Thus, from the system designer's point of view, the system designer is by definition at a disadvantage. From the system designer's point of view, and with regard to privacy concerns, embodiments may use the same set of data that attackers may use for identity fraud or attacks, but embodiments use that same information, which may be publicly available, to prevent or foil the bad deeds of attackers, and hence identify, detect, prevent, mitigate, and block fraudulent activities such as identity theft.

Moreover, collecting, filtering, and aggregating of raw publicly available data—what may generally be called data mining—is already being performed by all sorts of people and entities, e.g., search engines and social networking media. Such entities use the results of data mining in a very different way—e.g. behavioral targeting to increase the effectiveness of advertising and publishing campaigns, providing the results to marketing agencies to perform targeted advertising, and selling the results for profit—from its use for authentication. Embodiments are not specifically aimed at monetizing or creating profit from the results of data mining, but rather for increasing the security of a user, e.g., protecting a user's identity from abuse. In summary, the stochastic data used by embodiments is already available, data mining is already being performed on such stochastic data, and the results are not currently protected from various types of use, some of which may be regarded as abuse. Thus, it makes sense to use the results for purposes, such as user security, identity protection, and authentication, that can be viewed as beneficial to the user from whom the data is collected.

FIG. 1 is a diagram illustrating a system 100 for providing communications among a user (via a consumer electronic device 102), a financial service provider 104, and a commercial entity 106 (e.g., a bank, as shown in FIG. 1, a merchant, utility company, or other service provider), using a network of a communications provider, represented in FIG. 1, for example, by mobile network operator (MNO) cloud 108. FSP 104 may include a trusted integrity manager (TIM) 110, as described in U.S. patent application Ser. No. 12/643,972, filed Dec. 21, 2009, entitled "Trusted Integrity Manager (TIM)", which is incorporated by reference. MNO cloud 108 may include a trusted service manager (TSM) 112, as described in the "Trusted Integrity Manager (TIM)" patent application. CED 102 may include an embedded security element (eSE) 114 on which executes a trusted remote attestation agent (TRAA) 116 as described in the "Trusted Integrity Manager (TIM)" patent application and in U.S. patent application Ser. No. 12/751,733, filed Mar. 31, 2010, entitled "Trusted Remote Attestation Agent (TRAA)", which is incorporated by reference and is a continuation in part of the "Trusted Integrity Manager (TIM)" patent application. By coupling the TIM 110 function, acting as a server in a conventional client-server architecture, in the TSM 112 and an embedded secure element (eSE) 114 acting as a client—implementations of various embodiments may rely, for example, on eSE, Secure Memory Card, or Universal Integrated Circuit Card (UICC)—inside the CED 102, a level of verification and security may be provided for authenticating CED 102 and its user.

A deterministic method of authenticating CED 102 may include authentication of a user credential, e.g., a user name and password. For example, the user may enter a user name on the CED 102, which communicates the user name to FSP 104 via connection 105, and may then enter a corresponding password. If the password is correct for the user name, FSP 104 may then authenticate the user and the CED 102.

Also, for example, a user credential may comprise the SIM (Subscriber Identity Module) card of a mobile phone. For example, with mobile phones (assuming for this example that CED 102 is a mobile terminal), one vector of attack for hackers to obtain privileged-access to the terminal (CED 102) is to remove or otherwise disable the SIM (Subscriber Identity Module) card 118 and interrupt the communication channel 109 between the phone (CED 102) and the mobile network 108 and other endpoints such as those of financial service providers 104. TRAA 116 may address these problems by providing a set of pulse-check type steps to ensure that the security-sensitive connections (e.g., connections 105, 109) are available and active. If a vital check fails then a predetermined restriction may be enforced. The security provided by TRAA 116 may be considered to be as good as the strength of the enforcement mechanism of restriction rules. Thus, TRAA 116 may enable or improve deterministic methods of authenticating the CED 102 and its user.

Stronger forms of authentication generally involve the combination of more than one authentication factor. One such combination of factors may be categorized as: 1) what you know, e.g., passwords, passphrases, something that only an owner of the account knows; 2) what you have, e.g., hardware tokens, some sort of digital certificate, or a private key that is in your possession. For example, when connecting to a corporate VPN (virtual private network) a person may have a secure ID card in his possession; and 3) what you are, e.g., biometrics such as DNA samples, fingerprints, retinal scans or anything that may correspond biologically, physically, and uniquely to what you define yourself as. When combined properly, these artifacts can force an intruder to compromise several factors before being able to mount a meaningful attack. A strong authentication system must protect even low-entropy ("guessable") authentication methods from off-line attacks, even against adversaries with complete access to the communication channel. Strong authentication systems typically exchange a session key as well, which enables both data confidentiality and integrity after authentication has been successfully performed.

Figure 2:
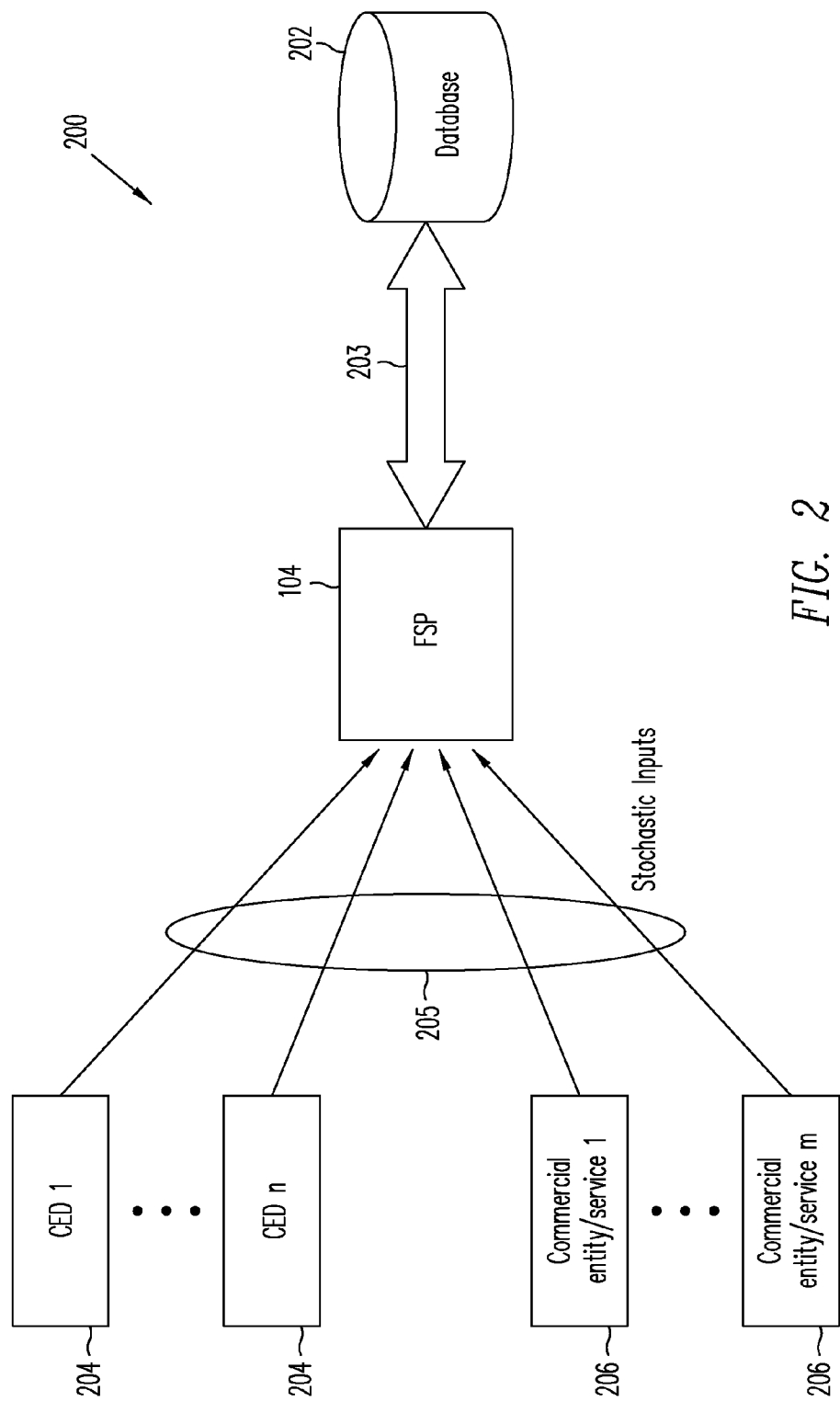
FIG. 2 is a system diagram illustrating entities and communication flows for a system employing behavioral stochastic authentication in accordance with an embodiment.

FIG. 2 is a diagram for a system 200 employing behavioral stochastic authentication. System 200 may include financial service provider 104. Financial service provider 104 may have access to a database 202. Access may be provided by a network 203 or other form of communication and the database 202 may be public or private. Financial service provider 104 may use database 202 for both storing and retrieving information and for conducting operations such as data mining. Financial service provider 104 may receive information (e.g., via communications 205 shown in FIG. 2) from a multitude of sources such as consumer electronic devices 204 (labeled CED 1 through CED n in FIG. 2) and other entities 206. As shown in FIG. 2, for example, entities 206 (labeled Commercial entity/service 1 through Commercial entity/service m in FIG. 2) may include commercial entities or services such as merchants, shops, restaurants, banks, and utility companies, to provide just a few examples. Financial service provider 104 may, for example, make use of a compute processor for accessing and using database 202 and for sending and receiving communications 205 from consumer electronic devices 204 and other entities 206.

Each of the consumer electronic devices 204 may bear some relationship or association to one or more users. For example, some of the consumer electronic devices 204 may "belong" to a single user; some may "belong" to multiple users or be shared among two or more users; or, any particular user may "own" or have access to one or more of consumer electronic devices 204. Despite the complexity, using tools such as database 202, FSP 104 may be able to keep track of all the various types of associations between users and consumer electronic devices 204, for example, by relying on the user entering a user name and password when conducting a transaction or other interaction with one the entities 206 and by keeping track of a unique identification for the CED 204 such as a SIM card ID. Similarly, using database 202, for example, FSP 104 may be able to make use of information, whether collected by FSP 104 or by others—such as publicly available information—regarding the many types of associations between users and consumer electronic devices 204, users and entities 206, and between consumer electronic devices 204 and entities 206. Such information may comprise a large volume of stochastic material.

Figure 3:
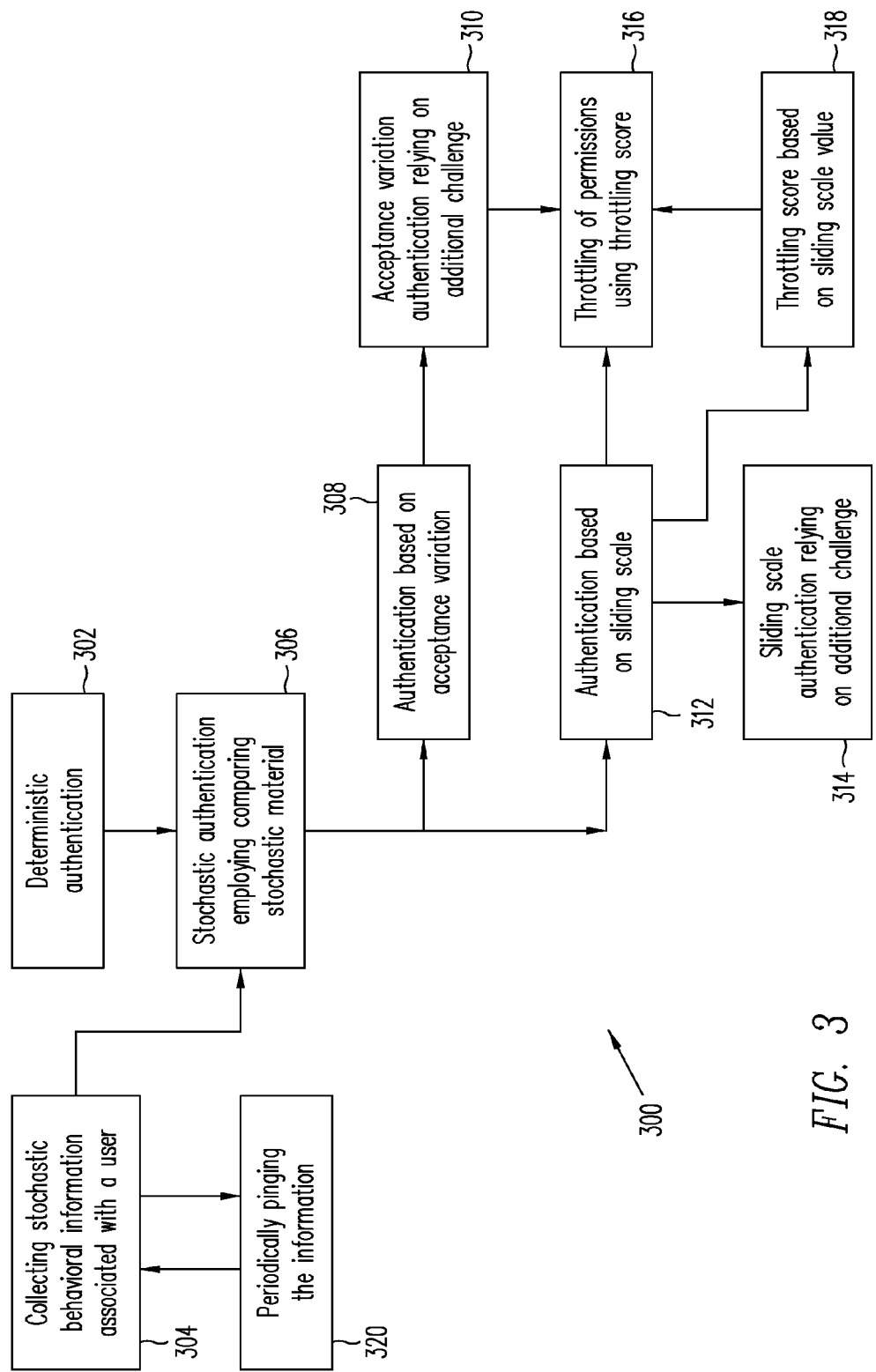
FIG. 3 is a flow chart illustrating a method for a system employing behavioral stochastic authentication in accordance with an embodiment.

FIG. 3 illustrates a method 300 for behavioral stochastic authentication that may be implemented, for example, with system 200. Behavioral stochastic authentication system 200 may extend the notion of authenticating a user based on some defined material—e.g., password, key, biometrics, referred to as deterministic authentication, e.g., step 302—to authenticating the user based on some stochastic material—such as information received via communications 205 seen in FIG. 2. Such stochastic material may include data which is based on the behavior of the user. For example, with a typical financial service provider 104 that may provide, e.g., secure payment services over the internet while insulating the buyer's financial information from the seller, a user may have some sort of buying habit. The buying habit, for example, corresponds to between eight to ten o'clock in the morning in the user's locale, or local area, buying coffee, and more specifically, 80% of the time the user buys coffee. This behavioral data may be collected by the FSP 104, e.g., step 304, and based on the same set of data that the FSP 104 collects, the user appears to be connecting on the website of FSP 104 at four o'clock p.m. in the afternoon or eight p.m. in the evening. The user may tend, for example, to buy digital music or some sort of digital media on-line. These are examples of digital behaviors that can be used to represent the particular user, and may be used to create a "portrait" of the user by the FSP 104.

These behavioral stochastic data may represent enough about the user to be used to authenticate the user, e.g., step 306. For example, if the user types in a user name "Fred" and password "123abc", it may be sufficient for some purposes, but it is spoofable. Suppose the user goes ahead after entering the user name with the correctly corresponding password and starts buying a Maserati; for example, the purchase has a price tag of $250,000, it is in the category of "car", and it is on an Italian website. The authenticator, e.g., FSP 104, may then look at the behavioral data that the authenticator has for the user. The authenticator may make a judgment, for example, as follows. The user name is correct; it exists; it is a valid user name. The password is correct; it corresponds to the user name in the data the authenticator has about the user. The authenticator may then consider what the user is attempting to do with the credential, e.g., the user name and password for this example. The authenticator may compare, e.g., step 306, what the user is attempting to do—a specific instance of stochastic material—with the stochastic material that has been gathered about the user, e.g., stochastic material associated with the user credential in the database 202.

The associated stochastic material may portray a number of various patterns about the user that comprise a behavioral portrait of the user and which exhibit a pattern of variation. For example, when buying groceries, the user may spend any amount, but seldom buys more than $100 worth at a time, so that the variation of expenditure fits within a pattern for that specific user or user credential associated with the user. For this example, the specifics of purchasing a car, the price, and origin of the website may either reasonably fit or not fit with the pattern of variation of the user's portrait. The authenticator may judge, e.g., step 306, whether the specific instance of stochastic material either fits or does not fit the pattern of variation of the user—Fred's behavioral portrait—and may make a decision—e.g., "yes, the user is authenticated now, and now the user is Fred." Without the extra considerations provided by the stochastic material and behavioral portrait, all that may be available to assert, for example, that "the user is Fred" is the user name and password, e.g., the deterministic credential at step 302. It is spoofable; it is phishable; it is prone to identity fraud and all the myriad problems of identity issues on the web. Deterministic methods (e.g., stopping at step 302) generally do not provide a way to make a further assertion; for example, the moment anyone presents a correctly matching user name and password, regarding, for example, "is this really Fred or is this someone who has stolen Fred's identity, perhaps by capturing his user name and stealing his password?"

In making the decision whether to authenticate, the authenticator, e.g., FSP 104, using, for example, a computer processor for comparing current stochastic material (e.g., the specific instance) associated with the user credential to stochastic material associated with the user credential in the database may make a judgment based on an acceptance variation, e.g., step 308.

Each user's behavioral portrait may provide for a level of elasticity, meaning statistically speaking, it may have a variance, or there is variation in the stochastic material underlying the behavioral portrait. There may be some level of allowed variation in each user's behavioral portrait. For example, it is not uncommon for people to travel, e.g., business trips or vacation trips are a common thing, and not unexpected. It is also not uncommon for people to move, e.g., change residence, from one location permanently to another location. These are examples of events that are possible and could happen.

A level of "acceptance variation" may be defined that allows for cases based on human behavior that are reasonable, yet may discriminate those from cases that are not so reasonable. For example, based only on fitting within the behavioral portrait variation described above, just by the mere fact that "Fred" has provided his correct user name and correct password may not, however, allow Fred to be authenticated to perform any transactions from Beijing because he has been based in Los Angeles. There are user cases like this, however, that are reasonable based on human behavior, and which may be authenticated using acceptance variation. The same case may, however, be denied authentication as illustrated by the following example. Suppose Fred performs one transaction in California at local time 5:00 p.m., which completely corresponds to Fred's behavioral portrait, e.g., Fred's habits of looking at stuff on eBay® or spending money using PayPal® or any other of Fred's "usual" activities. Three hours later, providing the same username and password, providing everything correctly, "Fred" performs a transaction from Beijing. Now, this is obviously not possible. Fred cannot possibly have flown himself from California to Beijing in three hours. So this is one example of how to differentiate something that is a legitimate change, a legitimate variation in behavior, from something that is illegitimate. So in this specific case, the authenticator, e.g., FSP 104, may deny the authentication and block the transaction or the authenticator may present a challenge to "Fred".

A challenge may be presented, e.g., step 310, in cases where, despite appearances that something is not right, it may nevertheless be possible that authentication should be granted. In such cases, e.g., the user has provided a username and password correctly, an alternative procedure may be provided in which, for example, the authenticator presents the user with an opportunity to provide some further verification or credential. For example, the authenticator may present the user with a message such as: "Based on some data that we have here, it appears to be problematic what you're trying to do; can you verify (for example) your street address or your zip code?" (Many examples could be provided for something that could further help assert whether the variation is legitimate or not, e.g., security questions with a pre-arranged answer or biometrics). In the case of something that is fundamentally physically impossible, as in the foregoing example, the authenticator may dispense with the additional challenge; the authenticator may immediately block the authentication and, for example, raise a red flag (e.g., computer alert on user's account) and put customer support on alert. For example, customer support may call the user to inform that "Something out of the ordinary has happened, there have been two subsequent transactions within three hours, one in California and another one in Beijing".

Another case is one in which acceptance variation does not immediately fail the authentication. For example, suppose Fred moved from Los Angeles to Irvine. This is something that is reasonable, e.g., may not immediately fail under acceptance variation, but does provoke an additional challenge. In this case, if the user passes the challenge, e.g., provides additional credential sufficient for FSP 104 to authenticate, the authenticator may start retraining, e.g., calibrating, system 200. The retraining or calibration may be viewed as collecting additional stochastic information, e.g., step 304. Exceeding the acceptance variation may occur from a legitimate behavior change—that is, the authenticator may consider that the behavior is something that is not static, not something that does not change, but the changes should be something that is "reasonable", that within reason could happen, such as, for example, the time and distance are possible.

Behavioral stochastic authentication system 200 may provide a level of credibility for each stochastic authentication by assigning a value from a spectrum of credibility. Assigned values for a particular user need not be static and may be assigned from a sliding scale. For example, a deterministic authentication, e.g., step 302, may still be required prior to the stochastic authentication, e.g., step 306, so that if a user is not able to provide a credential, e.g. matching username and password or basic authentication material, then the user is not authenticated; that remains the same. As the user provides more material, the authenticator may add on to the level of "credibility" of the authentication, also referred to technically as "assertion", as time progresses. Thus, as more information is provided about the user and the user's behavioral portrait is built up, that allows the authenticator to assign a sliding scale value of credibility to each authentication, e.g., step 312. For example, the authenticator may state to the user: you are authenticated a certain percentage, e.g., 15%, 20%, and so on. Thus, the sliding scale may be moved based on the accumulated data about the behavior that the authenticator has or can obtain about the user. Furthermore, and depending on the authentication percentage the user has, the amount of money that the user is authorized to spend may also be limited or controlled. There are several types of information that may define the behaviors useful for the stochastic material to be associated with each user. For example, the location based on which the user is logging in, e.g., based on the address of the user's computer. For example, the authenticator may see that 90% of the time the user is dialing in from the San Jose area, or connecting to a website from the San Jose area, and all of a sudden it goes to Beijing. In such case, if the new information violates the sliding scale value for the level of credibility previously assigned for that user because it does not correspond to the "behaviors" that the authenticator has from the user, an additional challenge, e.g., step 314 may be presented similar to that described above before authentication is granted, or if the challenge is not met, authentication may be denied.

Behavioral stochastic authentication system 200 may appear to rely on an authenticator, e.g., FSP 104, having been established in business long enough to accumulate enough stochastic material about its clients to be able to form portraits for applying stochastic authentication. So that if a business—such as FSP 104—is brand new, then it may seem that they would have to decline every authentication because they simply don't have data to form stochastic material associated with their users.

System 200 may provide a throttling mechanism, e.g., step 316, that can enable a new business to provide stochastic authentication. One consideration is that the new business does not necessarily have to rely only on the data that it itself has as there is a large volume of data of almost everyone on the web, which may be considered beneficial from the point of view of stochastic authentication. On the other hand, privacy advocates may have a number of concerns about such data. Despite such concerns, the volume of such data continues to increase as people are putting more and more data about themselves on the web. Also, such data is becoming more and more accessible to everyone. Whereas abusers of the data may use it maliciously to impersonate others, it seems incumbent on others to use the data for legitimate purposes of authentication and security.

Despite these considerations, system 200 may implement a throttling mechanism, e.g., step 316, so that, for example, if the new business, e.g., FSP 104, does not have enough data about its users or can not fetch enough data about one of it users, the throttling mechanism may be used to grant partial permissions based on a throttling mechanism score, up to one hundred percent of permissions available, depending on a successful stochastic authentication. The more data the authenticator business, e.g., FSP 104, gathers about the user, e.g., the more data the authenticator obtains about the user from the internet or other publicly available resources, the more the authenticator may assert the user's identity. For example, the sliding scale values may be used to set a throttling mechanism score for each user, e.g., step 318. For a particular user's sliding scale value, the throttling score that is set for the user may depend only on that sliding scale value or may vary, for a particular sliding scale value, from user to user. Upon authenticating the user, permissions may be conditionally granted based on the throttling mechanism score assigned to the user credential. An example of a permission that may be tied to some particular throttling mechanism score is to impose a predetermined transaction cap, such as $50, and deny transactions more than the predetermined transaction cap (or a total amount). A smaller throttling mechanism score may impose more restrictive permissions and a greater throttling mechanism score may impose less restrictive permissions, for example, Behavioral stochastic authentication system 200 may provide for periodically "pinging" (e.g., verifying the accuracy of the collected-data) the stochastic behavioral information associated with users, e.g., step 320. Implementations of behavioral stochastic authentication system 200 may rely for accuracy on collecting the stochastic material that is associated with each user, regardless of source, e.g., whether the data is obtained from a publicly available source such as the internet or gathered directly by the service provider, e.g., FSP 104. Because the world is constantly changing, system 200 may ping the stochastic behavioral information associated with a user to ensure that it has a current set of information to authenticate the user. For example, suppose that the last time the authenticator, e.g., FSP 104 or system 200, collected information about, e.g., the user's search habits, location, buying habits, and other stochastic information was about a year ago. System 200, based on an algorithm deemed appropriate—such as pinging yearly for some users and more or less often for other users based, e.g., on the sliding scale value or the throttling score—may fine tune and retune the user's stochastic information data. So for example, if part of the authenticator's information gathering included the user's location, zip code, shipping address, favorite website that the user frequently visits, and the type of cookies that the user has on the user's computer—periodically, once a year in the present example, the authenticator may double check those data. Instead of pinging the person, e.g., the user, in terms of verifying the information, the authenticator may want to check directly whether the behavioral information that the authenticator has about the user is still valid. As indicated in FIG. 3, pinging step 320, along with information collecting step 304 may be performed concurrently with, as well as before or after, the other steps of method 300. Thus the authenticator, e.g., FSP 104, may ensure that its data, e.g., data in system 200, is reasonably up-to-date so that stochastic authentication of a user does not rely on some static snapshot information gathered by system 200, for example, ten years ago.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system for use with a service provider and a consumer electronic device, the system comprising:
   a database of the service provider, the database comprising stochastic behavioral information associated with a user, wherein the stochastic behavioral information includes a stochastic material comprising buying habit information including a time of purchase and a location of the user at the time of purchase;
   a non-transitory memory storing machine-readable instructions; and
   one or more hardware processors coupled to the non-transitory memory and configured to read the machine-readable instructions to cause the system to perform operations comprising:

accessing the database for the stochastic behavioral information associated with the user for authenticating the user;

periodically pinging the stochastic behavioral information associated with the user, wherein:
the pinging comprises verifying at least a portion of the stochastic behavioral information; and
the periodicity of the pinging is set to a particular period of time determined according to a sliding scale value for the user that is based on an accumulation of data comprising the stochastic behavioral information associated with the user;

communicating with the consumer electronic device for providing communication between the user and the processor;

collecting a specific instance of stochastic material based on the communication with the consumer electronic device;

comparing the specific instance of stochastic material with the stochastic material in the database;

determining whether the specific instance of stochastic material is a fit to a pattern of variation portrayed by the buying habit information associated with the user; and authenticating the user, based on 1) the fit to the pattern of variation and 2) a computation directly from the specific instance of stochastic material, including a first time of a first purchase and a first location of the user at the first time of the first purchase, and the stochastic material in the database, including a second time of a second purchase and a second location of the user at the second time of the second purchase, that the difference in time between the first time and the second time is not less than a pre-specified minimum travel time for the user based on the distance between the first location and the second location.

2. The system of claim 1, wherein authenticating of the user further comprises:
evaluating a user credential provided via the consumer electronic device; and
comparing current information from the device regarding use of the user credential to stochastic material associated with the user in the database.

3. The system of claim 1, wherein authenticating of the user further comprises:
evaluating a user credential provided via the consumer electronic device, wherein the evaluating comprises comparing deterministic information of the credential; and
comparing current information from the device regarding use of the user credential to stochastic material associated with the user in the database, wherein:
the current information regarding use of the user credential comprises a specific instance of stochastic material;
the stochastic material associated with the user in the database comprises a pattern of variation; and
the specific instance of stochastic material is judged to either fit or not fit within the pattern of variation.

4. The system of claim 1, wherein authenticating of the user further comprises:
comparing current information from the device regarding use of a user credential to stochastic material associated with the user credential in the database, wherein:
the current information regarding use of the user credential comprises a specific instance of stochastic material;
the stochastic material associated with the user in the database comprises a pattern of variation; and
the specific instance of stochastic material is judged to fit within the pattern of variation based on a sliding scale.

5. The system of claim 1, wherein authenticating of the user further comprises:
comparing current information from the device regarding use of a user credential to stochastic material associated with the user credential in the database, wherein:
the current information regarding use of the user credential comprises a specific instance of stochastic material;
the stochastic material associated with the user in the database comprises a pattern of variation;
the specific instance of stochastic material is judged to fit within the pattern of variation based on a sliding scale;
a value of the sliding scale is assigned to the authenticating of the user; and
a challenge is provided based conditionally on the sliding scale value assigned to the authenticating of the user.

6. The system of claim 1, wherein authenticating the user further comprises:
comparing current information from the device regarding use of a user credential to stochastic material associated with the user credential in the database, wherein:
a throttling mechanism score is derived from the stochastic material associated with the user credential in the database;
the throttling mechanism score is assigned to the user credential; and
upon authenticating the user, permissions are conditionally granted based on the throttling mechanism score assigned to the user credential.

7. The system of claim 1, wherein authenticating the user further comprises:
comparing current information from the device regarding use of a user credential to stochastic material associated with the user credential in the database, wherein:
the current information regarding use of the user credential comprises a specific instance of stochastic material;
an acceptance variation is formed based on the stochastic material associated with the user in the database;
the specific instance of stochastic material is judged to either fit or not fit within the acceptance variation; and
a challenge is conditionally provided based on the judgment.

8. The system of claim 1, wherein authenticating the user further comprises:
comparing current stochastic material associated with the user credential to stochastic material associated with the user credential in the database; and
updating the database using the current stochastic material associated with the user credential.

9. A method for use with a service provider and a consumer electronic device, the method comprising:
authenticating the consumer electronic device with the service provider via a deterministic method;
periodically pinging stochastic material associated with a user of the consumer electronic device, wherein:

the stochastic material comprises buying habit information including a time of purchase and a location of the user at the time of purchase and stored in a database of the service provider;
the pinging comprises verifying at least a portion of the stochastic material; and
the periodicity of the pinging is set to a particular period of time determined according to a sliding scale value for the user that is based on an accumulation of data comprising the stochastic material associated with the user;
collecting a specific instance of stochastic material based on a communication with the consumer electronic device;
comparing the specific instance of stochastic material with the stochastic material in the database;
determine whether the specific instance of stochastic material is a fit to a pattern of variation portrayed by the buying habit information associated with the user; and
conditional upon authenticating the consumer electronic device via the deterministic method, authenticating the consumer electronic device based on 1) the determination of fit and 2) a computation from the specific instance of stochastic material, including a first time of a first purchase and a first location of the user at the first time of the first purchase, and the stochastic material in the database, including a second time of a second purchase and a second location of the user at the second time of the second purchase that the difference in time between the first time and the second time is not less than a pre-specified minimum travel time for the user based on the distance between the first location and the second location.

10. The method of claim 9, wherein the deterministic method includes authenticating a user credential.

11. The method of claim 9, wherein the stochastic material includes data based on behavior of the user.

12. The method of claim 9, further comprising:
obtaining-behavioral information regarding the user; and
storing the behavioral information to provide the stochastic material.

13. The method of claim 9, wherein authenticating the consumer electronic device based on stochastic material further comprises:
comparing current information from the device to the stochastic material associated with the user.

14. The method of claim 9, wherein authenticating the consumer electronic device based on stochastic material further comprises:
comparing current information from the device regarding use of a user credential to the stochastic material associated with the user, wherein:
the current information regarding use of the user credential comprises a specific instance of the stochastic material;
the stochastic material associated with the user portrays a pattern of variation; and
the specific instance of stochastic material is judged to either fit or not fit a portrait based on the pattern of variation.

15. The method of claim 9, wherein authenticating the consumer electronic device based on stochastic material further comprises:
comparing current information from the device regarding use of a user credential to the stochastic material associated with the user, wherein:
the current information regarding use of the user credential comprises a specific instance of the stochastic material;
the stochastic material associated with the user portrays a pattern of variation; and
the specific instance of stochastic material is judged to fit a portrait based on the pattern of variation using a sliding scale.

16. The method of claim 9, wherein authenticating the consumer electronic device based on stochastic material further comprises:
comparing current information from the device regarding use of a user credential to the stochastic material associated with the user, wherein:
the current information regarding use of the user credential comprises a specific instance of the stochastic material;
the stochastic material associated with the user portrays a pattern of variation;
the specific instance of stochastic material is judged to fit a portrait based on the pattern of variation using a sliding scale;
a value of the sliding scale is assigned to the authenticating of the consumer electronic device; and
a challenge is provided based conditionally on the sliding scale value assigned to the authenticating of the consumer electronic device.

17. The method of claim 9, wherein authenticating the consumer electronic device based on stochastic material further comprises:
comparing current information from the device regarding use of a user credential to the stochastic material associated with the user, wherein:
a throttling mechanism score is derived from the stochastic material associated with the user;
the throttling mechanism score is assigned to the user credential; and
upon authenticating the consumer electronic device, permissions are conditionally granted based on the throttling mechanism score assigned to the user credential.

18. The method of claim 9, wherein authenticating the consumer electronic device based on stochastic material further comprises:
comparing current information from the device regarding use of a user credential to the stochastic material associated with the user, wherein:
the current information regarding use of the user credential comprises a specific instance of the stochastic material;
the stochastic material associated with the user is used to form an acceptance variation;
the specific instance of stochastic material is judged to either fit or not fit within the acceptance variation; and
a challenge is conditionally provided based on the judgment.

19. The method of claim 9, wherein authenticating the consumer electronic device based on stochastic material further comprises:
comparing current stochastic material associated with a user credential to stochastic material associated with the user; and
updating a database by associating to the user the current stochastic material associated with the user credential.

20. A non-transitory machine-readable medium having stored thereon machine-readable instructions executable to cause a machine to perform operations comprising:
- authenticating a consumer electronic device with a service provider via a deterministic method that includes authenticating a user credential;
- periodically pinging stochastic behavioral information including a stochastic material comprising buying habit information including a time of purchase and a location of the user at the time of purchase and stored in a database of the service provider, wherein:
  - the pinging comprises verifying at least a portion of the stochastic behavioral information; and
  - the periodicity of the pinging is set to a particular period of time determined according to a sliding scale value for the user that is based on an accumulation of data comprising the stochastic behavioral information associated with the user;
- collecting a current information from the consumer electronic device regarding use of the user credential, wherein the current information regarding use of the user credential comprises a specific instance of the stochastic material comprising buying habit information associated with the user credential;
- comparing the specific instance of stochastic material with the stochastic material stored in the database wherein:
  - the stochastic material associated with the user portrays a pattern of variation;
  - the specific instance of stochastic material is judged to fit a portrait based on the pattern of variation using a sliding scale;
  - a value of the sliding scale is assigned to the authenticating of the consumer electronic device;
  - the stochastic material comprising buying habit information associated with the user credential is used to form an acceptance variation;
  - the specific instance of stochastic material is judged to either fit or not fit within the acceptance variation; and
  - a level of authentication is provided based on the sliding scale value, the fit of the acceptance variation, and a computation from the specific instance of stochastic material, including a first time of a first purchase and a first location of the user at the first time of the first purchase, and the stochastic material in the database, including a second time of a second purchase and a second location of the user at the second time of the second purchase, that the difference in time between the first time and the second time is not less than a pre-specified minimum travel time for the user based on the distance between the first location and the second location; and
- conditional upon authenticating the consumer electronic device via the deterministic method, authenticating the consumer electronic device according to the level of authentication.

* * * * *